Mar. 20, 1923.
G. H. CLOTWORTHY
AUTOMOBILE SIGNAL
Filed Feb. 3, 1922
1,448,728
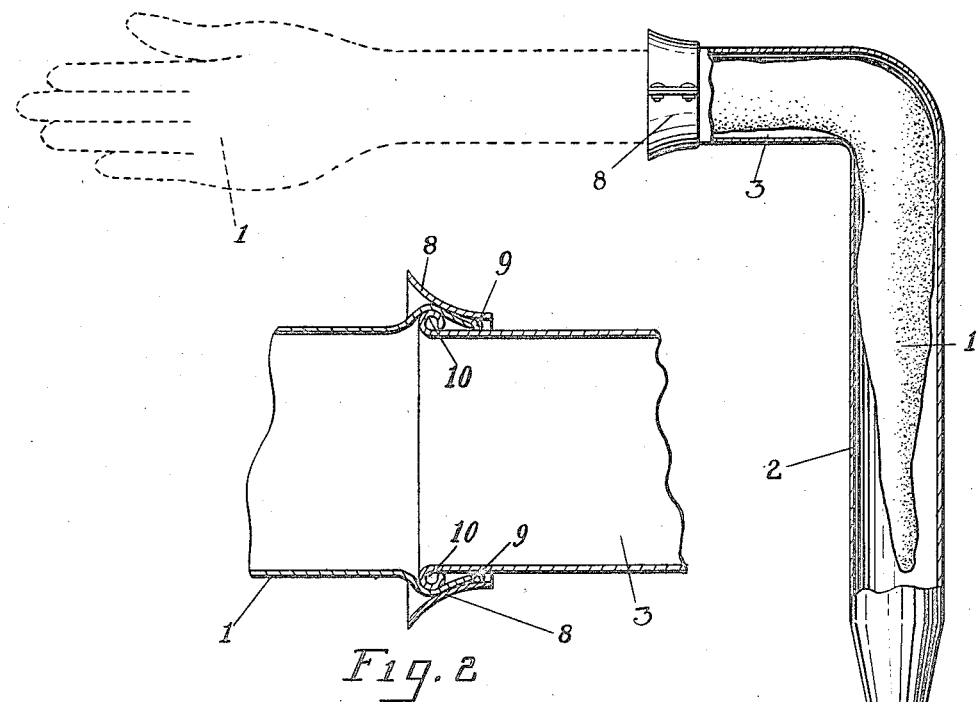
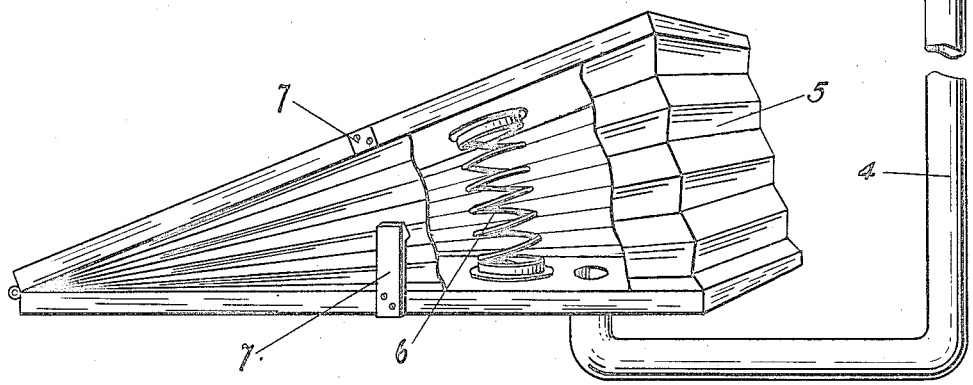
Fig. 1
Fig. 2
Inventor,
G. H. Clotworthy,
By Fetherstonhaugh & Co.
Attys Patented Mar. 20, 1923.

1,448,728

UNITED STATES PATENT OFFICE.

GUY HAMILTON CLOTWORTHY, OF CALGARY, ALBERTA, CANADA.

AUTOMOBILE SIGNAL.

Application filed February 3, 1922. Serial No. 533,909.

*To all whom it may concern:*

Be it known that I, GUY HAMILTON CLOTWORTHY, of the city of Calgary, in the Province of Alberta, Canada, have invented certain new and useful Improvements in Automobile Signals, of which the following is the specification.

My invention relates to improvements in automobile signals and the object of the invention is to devise a simple and effective pneumatic means for actuating the signal to enable the driver of the automobile to indicate to traffic his intention of stopping or changing direction.

My invention consists of an automobile signal constructed and arranged all as hereinafter more particularly described and illustrated in the accompanying drawing in which:

Fig. 1 represents an elevational view partly in section showing my signal and the means for actuating the same, said signal being in the inoperative position and Fig. 2 represents a vertical sectional view showing the means for connecting my signal to the container into which it is drawn when in the inoperative position.

Like characters of reference indicate corresponding parts in the different views.

1 is the signal consisting of a bag formed in the shape of a hand and constructed of flexible material impervious to air. 2 is a conduit shaped container having the horizontally disposed upper end 3. 4 is a tube connecting the lower end of the container 2 with the bellows 5. 6 is a spring for keeping the bellows in the normal expanded position. 7 is a spring clip suitably secured to one portion of the bellows and adapted to engage the other portion for holding the bellows in the contracted position when desired. 8 is a bell-mouthed shaped collar adapted to secure the inner end of the hand-shaped signal to the portion 3 of the conduit or container, the free end of the signal having a rolled edge or bead 9 adapted to extend over the beaded end 10 of the portion 3. This makes an airtight joint between the signal and the portion 3 of the conduit or container 2.

It is to be understood that the signal can be secured in any suitable position on the automobile, the bellows being designed to be situated within reach of the foot of the driver of the vehicle.

The operation of the device is as follows:

If the driver wishes to indicate to traffic his intention of stopping or changing direction he presses the bellows with his foot into the contracted position thus forcing the air up through the tube 4 into the conduit or container 2 and as the upper end 3 of the conduit is sealed by the signal hand 1, such signal will be forced out of the conduit and will take up the inflated position illustrated in dotted lines in Figure 1, the normal or deflected position of the signal hand being within the said conduit as is illustrated in full lines in Figure 1.

As the bellows is pressed into the contracted position the spring clip 7 attached to one portion of the bellows will engage the other portion thereof and thus retain the bellows in such position even though the foot of the operator is removed therefrom and consequently as the connections between the signal and the bellows are airtight such signal will be retained in the inflated or signalling position.

When it is desired to release the signal it is only necessary for the driver to press his foot against the clip 7, thus allowing the bellows to be restored to its normal position under the influence of the spring 6 with the result that the signal will be deflated by the air being displaced therefrom. When this occurs the suction will draw the signal into the container or conduit 2 and it will assume the position illustrated in full lines in Figure 1.

From the above description it will be seen that I have devised a simple and effective automobile signal which will be simple in use and can be cheaply constructed and readily installed.

What I claim as my invention is:

1. In an automobile signal, the combination with a container open at both ends, of a signal comprising a bag of flexible material impervious to air, the mouth of such bag being secured to one end of the container, means connected to the other end of the container for introducing air to the signal bag, and means for exhausting the air therefrom for drawing the signal bag into the container.

2. In an automobile signal, the combination with a container open at both ends and one end bent at an angle to its main portion, a bead on the extremity of such bent end, of a signal comprising an inflatable bag of flexible material impervious to air, the mouth of such bag extending over the bead on the container end, and means for securing the mouth of the bag in position over such container end.

3. In an automobile signal, the combination with a container, of an inflatable signal bag of impervious material suitably secured to the open mouth of the container, means for introducing air into the signal through the container and means for exhausting the air from the signal whereby it is drawn into the said container.

4. An automobile signal comprising a conduit shaped container having open upper and lower ends, a signal consisting of an inflatable flexible bag of impervious material adapted to be secured over the upper end of the container and communicating therewith, a bellows and a tube connecting the interior of the bellows with the lower end of the container.

5. An automobile signal comprising a conduit shaped container having open upper and lower ends, a signal consisting of an inflatable flexible bag of impervious material adapted to be secured over the upper end of the container and communicating therewith, a bellows, a tube connecting the interior of the bellows with the lower end of the container, said bellows normally spring-held in the expanded position and a clip for retaining the bellows in the contracted position.

GUY HAMILTON CLOTWORTHY.